(12) United States Patent
Bernal et al.

(10) Patent No.: US 10,776,659 B2
(45) Date of Patent: Sep. 15, 2020

(54) SYSTEMS AND METHODS FOR COMPRESSING DATA

(71) Applicant: Goodrich Corporation, Charlotte, NC (US)

(72) Inventors: Edgar A. Bernal, Webster, NY (US); Kishore K. Reddy, Vernon, CT (US); Michael J. Giering, Bolton, CT (US)

(73) Assignee: Goodrich Corporation, Charlotte, NC (US)

( * ) Notice: Subject to any disclaimer, the term of this patent is extended or adjusted under 35 U.S.C. 154(b) by 56 days.

(21) Appl. No.: 15/380,519

(22) Filed: Dec. 15, 2016

(65) Prior Publication Data

US 2018/0063538 A1    Mar. 1, 2018

Related U.S. Application Data

(60) Provisional application No. 62/380,193, filed on Aug. 26, 2016.

(51) Int. Cl.
*H04N 19/426* (2014.01)
*G06K 9/62* (2006.01)
*G06K 9/00* (2006.01)
*G06K 9/32* (2006.01)
*G06K 9/03* (2006.01)
(Continued)

(52) U.S. Cl.
CPC ......... *G06K 9/6203* (2013.01); *G06K 9/0063* (2013.01); *G06K 9/03* (2013.01); *G06K 9/3233* (2013.01); *G06K 9/6256* (2013.01); *G06K 9/6267* (2013.01); *G06N 5/02* (2013.01);
(Continued)

(58) Field of Classification Search
CPC ........................... G06K 9/6203; G06K 9/0063
See application file for complete search history.

(56) References Cited

U.S. PATENT DOCUMENTS

| 6,798,914 B1 | 9/2004 | Nanni et al. |
| 6,934,415 B2 | 8/2005 | Stentiford |

(Continued)

FOREIGN PATENT DOCUMENTS

| WO | WO-2011048597 A1 | 4/2011 |
| WO | WO-2014194345 A1 | 12/2014 |

OTHER PUBLICATIONS

Rameau Francois et al: "Control of a PTZ camera in a hybrid vision system", 2014 International Cnference on Computer Vision Theory and Applications (VISAPP), Scitepress, vol. 3, Jan. 5, 2014 (Jan. 5, 2014), pp. 397-405, XP032792206, [retrieved on Oct. 8, 2015] * p. 1 *.

(Continued)

*Primary Examiner* — William C Vaughn, Jr.
*Assistant Examiner* — Jerry T Jean Baptiste
(74) *Attorney, Agent, or Firm* — Locke Lord LLP; Scott D. Wofsy; Judy R. Naamat

(57) ABSTRACT

A method of compressing data in the context of a decision-making task includes receiving raw data, analyzing the raw data to determine content of the raw data, and adjusting one or more one data compression parameters in a compression algorithm. The adjustment of the one or more compression parameters is based on the content of the raw data and a received decision-making task to produce a modified compression algorithm. The raw data is thereafter compressed using the modified compression algorithm and output as compressed data.

21 Claims, 4 Drawing Sheets

(51) Int. Cl.
  *H04N 5/232*   (2006.01)
  *H04N 19/103*  (2014.01)
  *G06N 5/02*    (2006.01)

(52) U.S. Cl.
  CPC ....... *H04N 5/23296* (2013.01); *H04N 19/103* (2014.11); *H04N 19/426* (2014.11)

(56) References Cited

U.S. PATENT DOCUMENTS

| | | | |
|---|---|---|---|
| 8,223,837 B2 | 7/2012 | Sun et al. | |
| 8,369,652 B1 | 2/2013 | Khosla et al. | |
| 8,610,735 B2 | 12/2013 | Park et al. | |
| 9,014,467 B2 | 4/2015 | Hu et al. | |
| 9,129,158 B1 | 9/2015 | Medasani et al. | |
| 9,147,255 B1 | 9/2015 | Zhang et al. | |
| 9,204,169 B2 | 12/2015 | Han et al. | |
| 9,317,776 B1 | 4/2016 | Honda et al. | |
| 2005/0232497 A1* | 10/2005 | Yogeshwar | H04N 19/56 382/232 |
| 2009/0015674 A1 | 1/2009 | Alley et al. | |
| 2010/0124274 A1* | 5/2010 | Cheok | H04N 19/152 375/240.03 |
| 2011/0026837 A1 | 2/2011 | Kita | |
| 2012/0023504 A1* | 1/2012 | Noam | H04N 19/149 718/105 |
| 2012/0328161 A1 | 12/2012 | Palenychka et al. | |
| 2014/0194345 A1 | 7/2014 | Peoples et al. | |
| 2016/0125246 A1* | 5/2016 | Ryhorchuk | H04N 5/23206 348/143 |
| 2016/0292589 A1 | 10/2016 | Taylor, Jr. et al. | |
| 2017/0064319 A1* | 3/2017 | Fram | H04N 19/426 |
| 2017/0124379 A1* | 5/2017 | Zhang | G06K 9/6272 |

OTHER PUBLICATIONS

European Search Report received from the European Patent Office (EPO) dated Jan. 29, 2018 for Application No. EP17188007.3.

* cited by examiner

SYSTEMS AND METHODS FOR COMPRESSING DATA

CROSS-REFERENCE TO RELATED APPLICATIONS

This application claims priority to and the benefits of U.S. Provisional Application No. 62/380,193, filed Aug. 26, 2016, the contents of which are incorporated herein in its entirety.

BACKGROUND OF THE INVENTION

1. Field of the Invention

The present disclosure relates to data acquisition and processing, and more particularly to systems and methods of compressing data representing a phenomena of interest.

2. Description of Related Art

The number of physical devices with data acquisition, storage and transmission capabilities is rapidly increasing. The trend of consumer electronics such as mobile phones and smart watches being equipped with electronics, software and sensors that enable the devices to collect and exchange data, is quickly extending to other physical devices including vehicles and buildings. Consequently, the amount of data being collected, stored and transmitted is continuously growing.

Data compression is commonly employed in data acquisition, transmission, storage, and processing frameworks. This is in response to the aforementioned trend of sensors to capture ever increasing amounts of digital data including images and/or videos, audio, and motion data. To make matters worse, not only is the amount of data being captured continuously increasing, but also its resolution, e.g., the number of pixels in images, the number of frames per second in videos, the acquisition rate, and the bit depth. Since the media and channels used to convey the information associated with the data are generally capacity-limited, the processing systems that make use of such data generally receive it in compressed form, decompress it, and thereafter process it in the original decompressed domain. This implies that most, if not all, the information required to perform the processing tasks has to be included within the decompressed data. Examples of such processing tasks include speech recognition from audio, object classification and localization, and scene analysis from still images; action recognition from videos; human pose detection and joint localization from depth or range data; and multimodal data analysis via fusion frameworks which rely on more than one type of data to make automated decisions. However, the compression methods traditionally applied to digital data are generic in nature, and usually disregard the type of analysis the data is intended for. Additionally, and in order to achieve high compression ratios, the more commonly applied compression techniques involve discarding a portion of the data, and for this reason are termed lossy compression methods. For example, video compression standards such as H264 and H265 which were optimized for human consumption, are used even in cases when the acquired video is meant to be processed by machines for automated video-based decision-making tasks; the portions of the data that is discarded in the compression process are those deemed not relevant to the human visual system. Since machines don't have the same perceptual limitations as humans, the features preserved by the lossy compression approaches utilized are not necessarily the most appropriate for the analysis tasks that are applied to the data further down the processing pipeline.

Such conventional methods and systems for compression have generally been considered satisfactory for their intended purpose. However, there is still a need in the art for improved systems and methods of compressing data intended for automated analysis and machine consumption. These methods must take into account not only the nature of the data being compressed, but also the task for which the data is intended. The present disclosure provides a solution for this need.

SUMMARY OF THE INVENTION

A data processing system includes a data-receiving device, a controller operatively connected to the data-receiving device, and a non-transitory machine-readable memory disposed in communication with the controller. The memory has instructions recorded on it that, when read by the controller, cause the controller to receive or acquire raw data, analyze the raw data to determine content of the data, and adjust at least one compression parameter in a compression algorithm based on the content of the data and a received decision-making task to produce a modified compression algorithm. The instructions also cause the controller to compress the data using the modified compression algorithm and output the compressed data.

In certain embodiments, the modified compression algorithm can preserve with high fidelity features in the raw data that are relevant to the decision-making task. The compression algorithm can include an autoencoder, and the autoencoder parameter adjustment can be done in a training stage, such as an off-line training. It is contemplated that the training stage can include instructions which cause the controller to adjust the parameters of the autoencoder based on the optimization of at least one of a reconstruction metric and a classification metric.

A method of compressing raw data includes receiving the data and analyzing the data to determine the nature of the data. A data compression parameter is adjusted based on the content of the data and a received decision-making task, the data compressed using the selected compression parameter, and the data output as compressed data.

It is also contemplated that compressing the raw data can include application of one or more non-linear mappings that map the raw data from its original high-dimensional space a lower dimensional space, the parameters of the mapping being adjustable to at least one of the data and a task-oriented metric corresponding to a received decision-making task, such as a speech recognition, object classification or action/activity recognition task.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
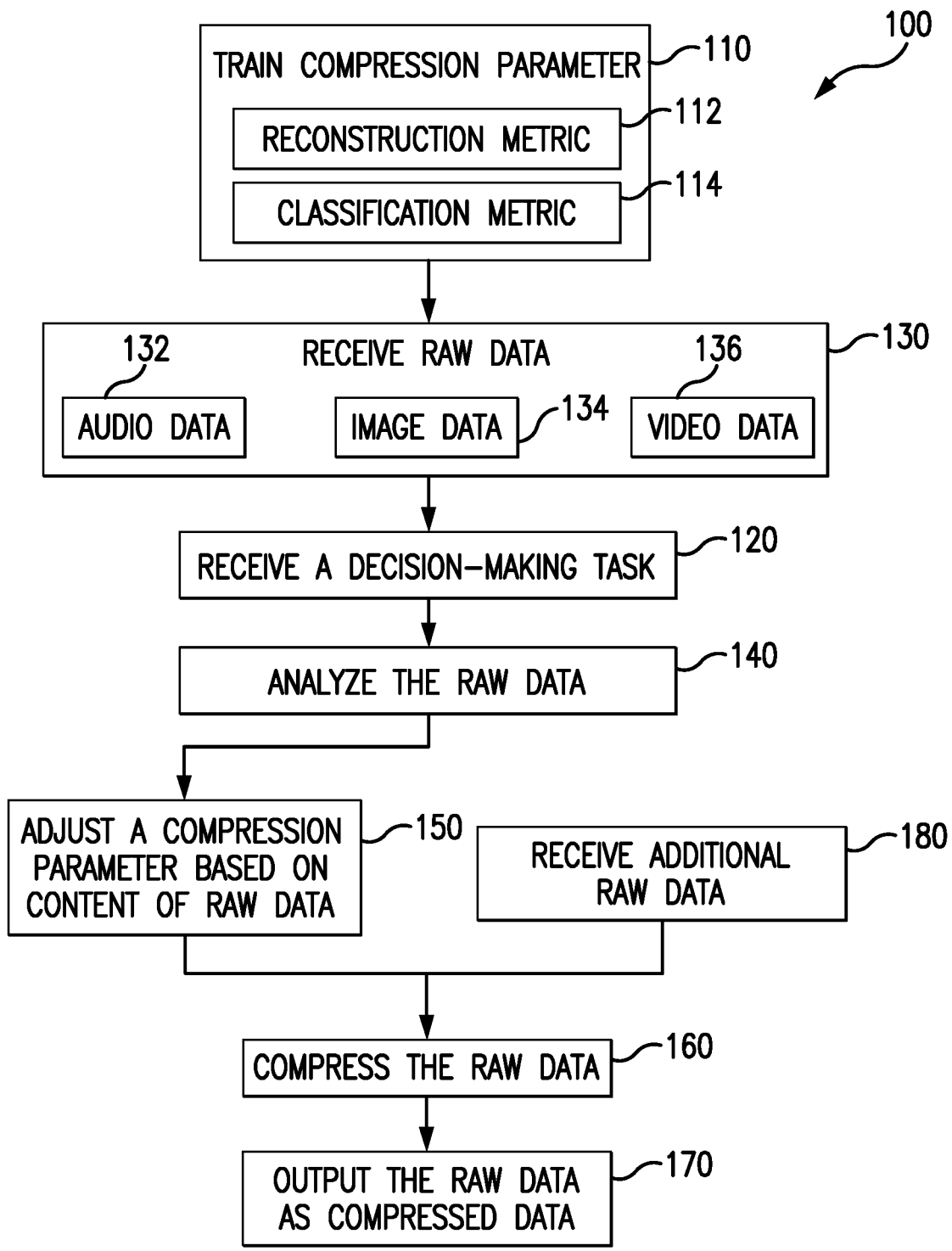
FIG. 1 is a block diagram of a method of compressing data, schematically showing raw data being compressed according to a received decision-making task.

Reference will now be made to the drawings wherein like reference numerals identify similar structural features or aspects of the subject disclosure. For purposes of explanation and illustration, and not limitation, a diagram of a data compression method in accordance with the disclosure is shown in FIG. 1 and is designated generally by reference character 100. Other embodiments of data compression methods and systems for compressing data in accordance with the disclosure, or aspects thereof, are provided in FIGS. 2-4, as will be described. The systems and methods described herein can be used for compressing image data acquired using aircraft such as an unmanned aerial vehicle (UAV), though the present disclosure is not limited UAV vehicles or to image data in general.

Referring to FIG. 1, method 100 of compressing data is shown. Method 100 includes adjusting a compression parameter in a training stage, as shown with box 110. The compression parameter can be estimated, by way of example, via optimization of a reconstruction metric 112 and/or optimization of a classification metric 114. Adjusting a compression parameter is equivalent to adjusting a decision-making rule related to a decision-making task. Method 100 also includes receiving a decision making task, as shown with box 120, and receiving raw data, as shown with box 130. The raw data can include audio data 132, image data 134, and/or video data 136 by way of non-limiting examples.

The raw data is analyzed, as shown with box 140. Based on the analysis of the raw data a compression parameter is adjusted, as shown with box 150. The adjusted compression parameter may include a compression parameter that was previously adjusted concurrently with a decision-making rule. The raw data is then compressed, as shown with box 160, and thereafter output, as shown with box 170. Additional data can be received prior to adjustment of the compression parameter, coincident with the adjustment of the compression parameter, or following the adjustment of the compression parameter, as shown with box 180.

Figure 2:
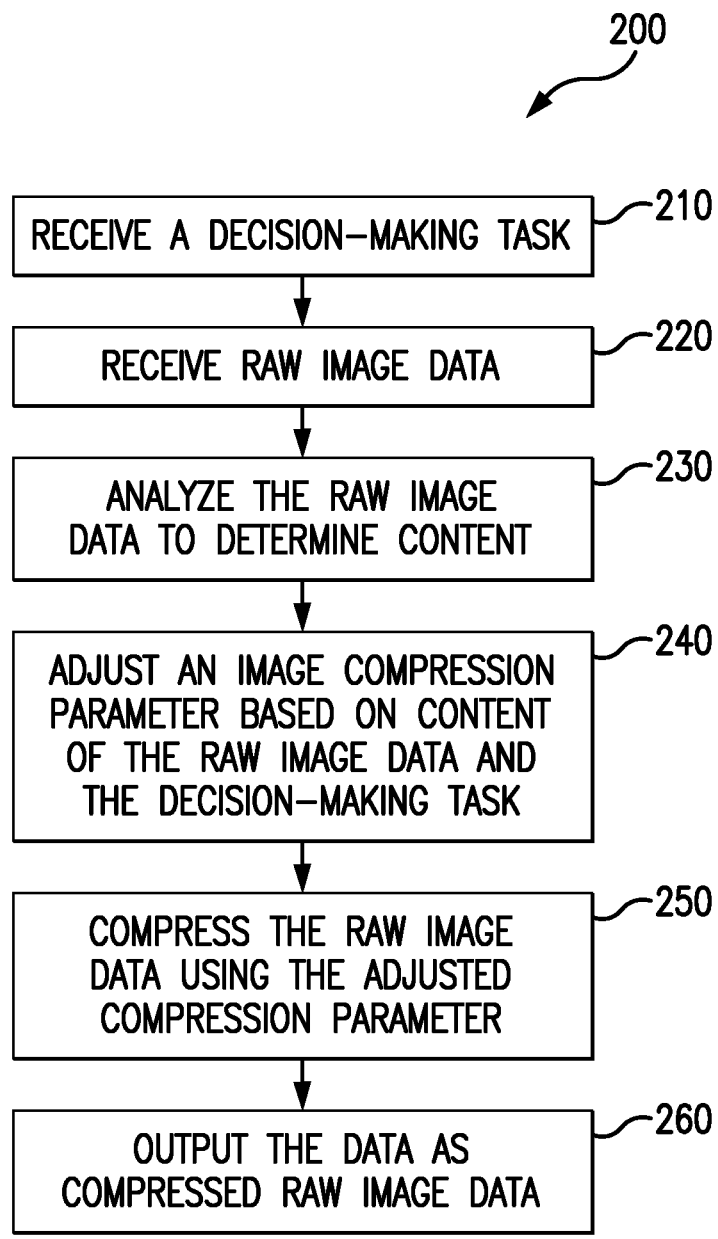
FIG. 2 is a block diagram of a method of compressing image data, schematically showing raw image data being compressed according to a received decision-making task.

With reference to FIG. 2, an exemplary method for compressing data, e.g., a method 200 of compressing image data is shown. Method 200 includes receiving a decision-making task, as shown with box 210. Method 200 also includes receiving raw image data, as shown with box 220. The raw image data is analyzed to determine content, as shown with box 230, and an image compression parameter based on the content of the raw image data and the received decision-making task are adjusted, as shown with box 240. The raw image data is then compressed using the adjusted image compression parameter (and/or the modified compression algorithm), as shown with box 250, and output as compressed raw image data as shown with box 260.

Figure 3:
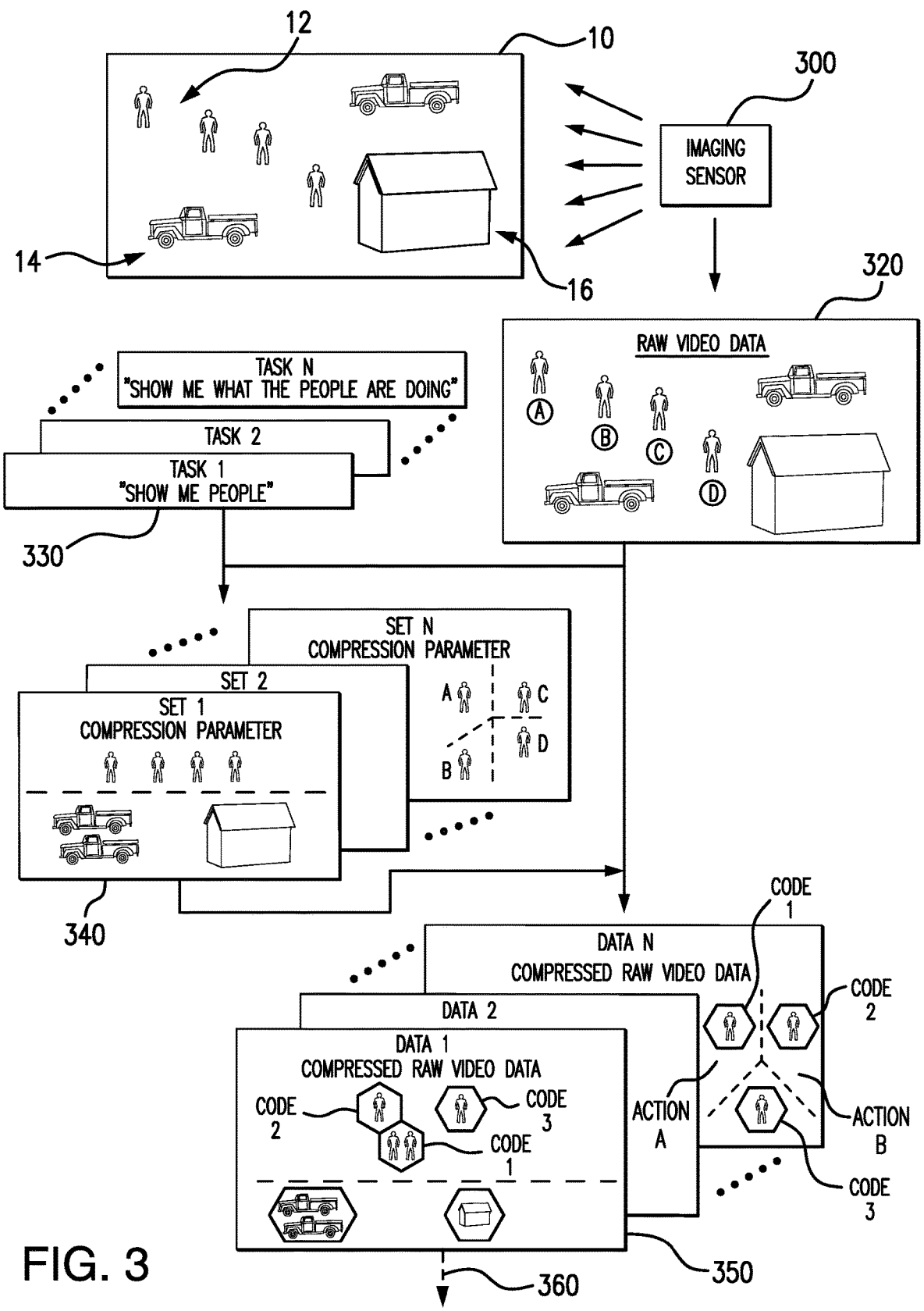
FIG. 3 is a schematic view of an exemplary embodiment of an image compression and analysis method in accordance with the present disclosure.

With reference now to FIG. 3, method 200 is shown schematically to illustrate an exemplary embodiment. An exemplary system 300 with a data-receiving device 302, e.g., an imaging device (shown in FIG. 4), is positioned such that it produces imagery with a field of view 10. Field of view 10 includes a plurality of objects of potential interest, the illustrated exemplary scene including objects classifiable as people 12, vehicles 14, and structures 16 by a visual attention algorithm. Field of view 10 also includes a plurality of actions being performed by people 12, e.g., actions A-D.

Control module 310 (shown in FIG. 4) of system 300 receives decision-making task 310, which instructs control module to communicate system 300 to output compressed raw image data 320 including features descriptive of objects of interest classified as people, e.g., people 12 in scene 10 when decision-making tasks consists of detecting people in the field of view. In view of a received decision-making task 330, control module 310 adjusts a compression parameter 340 based on the content of the image data and the received decision-making task by including features descriptive of objects of interest classified as vehicles, in particular those that help discriminate vehicles from people, as indicated in 320, as also indicated in 320, and including features descriptive of objects of interest classified as structures, in particular those that help discriminate structures from people, as also indicated in 320. Alternatively, when the decision-making task consists in determining the type of activity being carried out by people 12, control module 310 communicates system 300 to output compressed raw video data 320 including features descriptive of actions of interest, and in particular, features that help discriminate actions A, B, C and D from each other. This becomes the modified compression algorithm for analyzing raw image/video data 320, which is applied to raw image data 320 to compress raw image/video data 320 into compressed raw image/video data 350. In the illustrated exemplary embodiment, compressed raw image/video data 350 includes less information than raw image/video data 320, which facilitates communication of the information in scene 10 via an exemplary bandwidth-constrained communication link 360 or storage of the information in scene 10 to a storage device (not shown for reasons of clarity). This has the advantage of alleviating the bottleneck that communication link 360 could otherwise have posed in the data collection process, where developments in image acquisition may have outpaced the ability of data communications systems to contemporaneously transmit imagery for exploitation.

Figure 4:
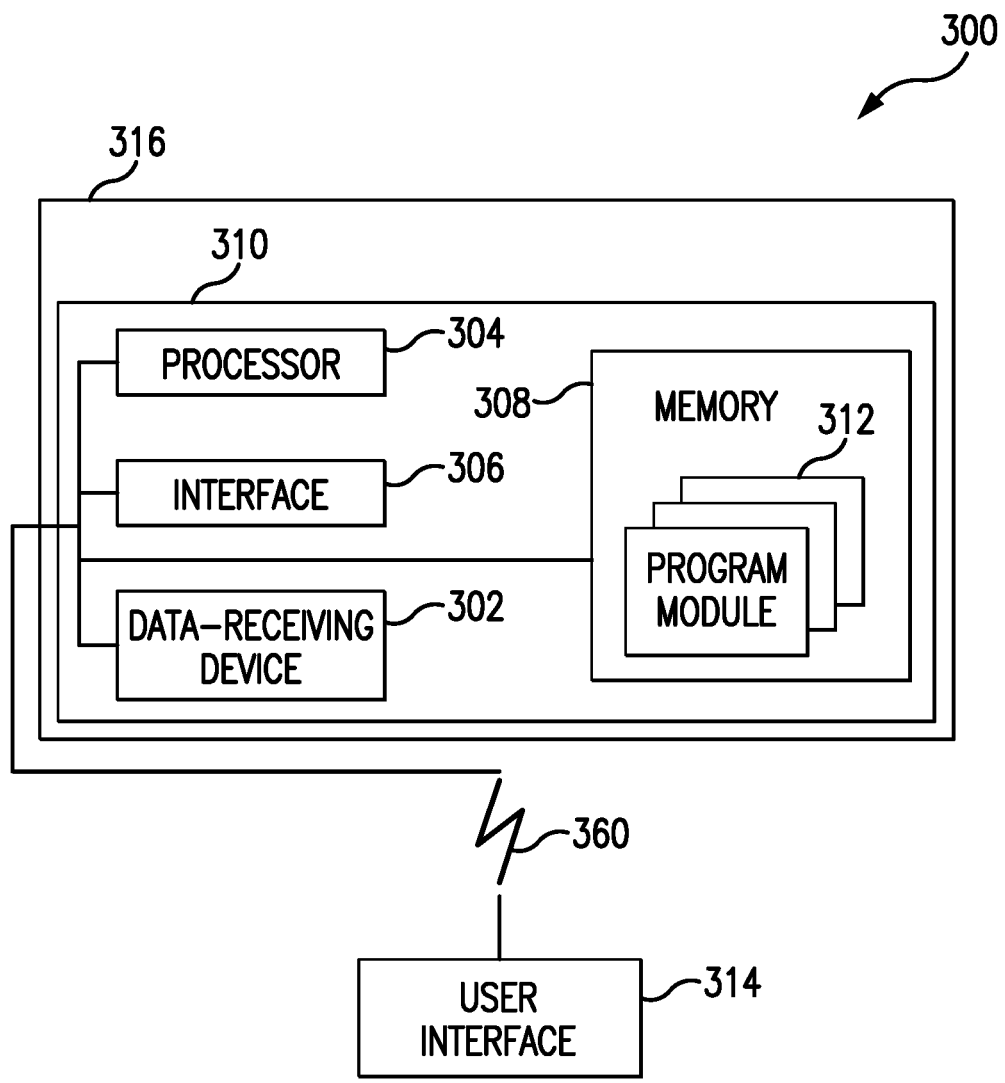
FIG. 4 is a schematic view of an exemplary embodiment of a data processing system, showing a system for compressing data from a data-receiving device prior to storage, transmission to a remote user interface, or processing.

With reference to FIG. 4, an exemplary embodiment of system 300 is shown. System 300 includes a UAV 316 carrying controller 310 and linked by communications link 360 to a user interface 314. Controller 310 includes a processor 304 disposed in communication with an interface 306, data-receiving device 302 and a memory 308. Memory 302 includes a non-transitory machine-readable medium having a plurality of program modules 312 recorded thereon with instructions that, when read by controller 310, cause controller 310 to undertake certain actions. In particular, the instruction cause controller 310 to execute the steps of method 100 (shown in FIG. 1) and/or method 200 (shown in FIG. 2).

In certain embodiments, data-receiving device 302 includes an imaging system and data acquisition device, such as an imaging sensor optically coupled to optics for forming an image on the imaging sensor. The imaging sensor can be a focal plane array, e.g. a two-dimensional array, or any other suitable type of imaging sensor. In certain embodiments, the imaging sensor can be arranged to generate image data using visible wavelength band electromagnetic radiation, e.g., blue-red-green light, incident on the imaging sensor. In accordance with certain embodiments, the imaging sensor can be arranged to generate image data representative of non-visible wavelength band electromagnetic radiation, e.g., short-wavelength infrared band electromagnetic radiation, near-infrared band electromagnetic radiation, mid-range band infrared electromagnetic radiation, and/or thermal band electromagnetic radiation, incident on imaging sensor.

In some embodiments, the data sensing device can be an audio or sound sensor, for example a microphone, which operates by detecting differences in air pressure and transforming them into electrical signals. Sound sensors may have built-in amplifiers to increase the strength of the incoming signal. In some embodiments, the data sensing device can be a motion or inertial sensor such as an accelerometer. Accelerometers can measure acceleration in one or more axes, usually orthogonal to each other. In some embodiments, the data sensing device is a receiver which receives a continuous signal varying in amplitude, phase or other property in proportion to a desired variable encoding data, which can include text, audio, video or other type of data to be processed. The received or acquired data is then processed in order to perform an automated decision-making task. Examples of such decision-making tasks include traditional computer vision techniques which make inferences about visual information such as images and video, including, but not limited to, performing scene analysis, object detection, object recognition, object localization, action and activity segmentation and action recognition. Decision-making tasks can also include audio processing for speech recognition or speaker identification. Decision-making tasks can, more generally, include analysis of multimodal data wherein the data being processed includes different modalities, and the different modalities are analyzed concurrently in order to issue a decision about the phenomena of which the data is representative. Examples of multimodal analysis tasks include speech recognition from video and audio data of the speaker, action recognition from video and motion data of the entity performing the action, personal identity verification from analysis of multiple signals indicative of a person's biometrics, among others.

Since the acquired data is often stored or transmitted prior to its analysis, compression is often performed before transmission or storage take place in order to minimize the channel bandwidth or storage requirements to carry out the tasks. Generally speaking, there are two types of compression algorithms, depending on whether the original data can be exactly recovered from the compressed data or not: lossy and lossless compression. Lossy compression techniques discard information in the original or raw data in order to achieve compression. Lossless compression techniques enable exact reconstruction of the original or raw data stream from the compressed data, but do not achieve as high compression ratios as lossy approaches. Consequently, lossy compression is often preferred.

The type of compression applied may also depend on the type of data being compressed. For instance, MPEG-1 and MPEG-2 lossy audio coding techniques are often used to compress consumer audio. Similarly, H264 and H265 are often used to encode video in a lossy manner. Since the data to which most of the compression algorithms is applied is largely intended for human consumption, the portions of the data that traditional compression algorithms discard are those that are deemed irrelevant to the human. For instances, frequencies that are beyond the normal hearing range of 20-20 kHz are often discarded from an audio signal. Similarly, the chromatic components in a video signal are assigned fewer bits than their achromatic counterparts to account for the differences between chromatic and achromatic sensitivities in the human visual system. Clearly, when the data is intended for automated analysis, e.g., by an algorithm, prevalent lossy compression techniques may discard elements of the data that are of relevance to the machine performing the analysis. This is because machines do not have the same perceptual limitations as the human sensory systems. It is then desirable to have compression frameworks that are aware of the intended use of the data being processed and adjust the nature of the compression stage accordingly.

With continuing reference to FIG. 4, the plurality of program modules 312 can include one or more of a compression module, a feature extraction module, and a decision-making module. The feature extraction module can be operatively connected with the imaging device to obtain image data from a visible wavelength band sensor array, e.g., an imaging sensor, for obtaining images based on visible light incident on the imaging device. In some instances, the feature extraction module can be operatively connected with the imaging device to obtain image data from an infrared wavelength band sensor array, e.g., a sensor array, such as from incident electromagnetic radiation in one or more of a SWIR wavelength band, a NIR wavelength band, a MIR wavelength band, or a thermal wavelength band.

The compression module and the feature extraction module can be communicative with the image acquisition module. The compression module may be configured to generate a compressed data representation directly from the raw imagery acquired by the feature extraction module. In certain embodiments, the compression module may generate a compressed data representation of the feature representation extracted by the feature extraction module from the raw image data. It is contemplated that compression parameters are selected and applied by the compression module according to a type of data being processed and/or the type of decision to be made from image data obtained by the feature extraction module.

The decision-making module is communicative with the feature extraction module and is configured to make decisions based on information extracted from the data. The decision may be, for example, identification of a type of object in the scene and/or identification of a type of activity taking place in the scene. In alternative embodiments, the decision may be related to a speech recognition task or speaker identification from incoming audio data. In some embodiments, the decision may be based on the analysis of multiple data modalities, including but not limited to images (from a still camera), video (from a video camera), depth data (from a depth or range sensor), audio (from a microphone), acceleration (from an accelerometer), orientation (from a gyroscope), or the strength and/or direction of a magnetic field (with a magnetometer).

In some embodiments, the data analysis process is performed by a data analysis system comprising a feature extraction module and a decision-making module. In one embodiment, the feature extraction module would first decompress, then extract from the incoming data stream, features representative of the data. Such features may comprise features selected a priori including color, texture, edge, human visual saliency, depth and shape descriptors in the case of visual data, or frequency and phase descriptors in the case of one-dimensional sequential data such as audio. Alternatively, features may be learned in an end-to-end fashion via the use of deep neural networks (NN) including fully connected feedforward networks, multi-layer perceptrons and convolutional neural networks (CNN). These networks process the incoming visual data through a series of layers that effectively perform non-linear mappings of the input data. The output of each intermediate layer can be interpreted as a data feature. Whatever the choice of features, it is to be appreciated that the most relevant features to the decision-making task have been preserved by the compression algorithm, and thus are present in the decompressed data stream. The decision-making module makes a decision on the incoming data according to a previously received decision-making task. The decision-making module usually comprises a classifier which decides, based on the analysis of the extracted features and a set of previously learned decision-making rules, the category to which the incoming data belongs, effectively making a classification or a detection assessment. The classifier in the decision-making module is usually trained a priori, based on representative data for which labels exist. The classifier effectively learns, in the training process, the optimal decision-making rules or boundaries in the feature space that best separate data belonging to different classes. The performance of the traditional classification framework is clearly bounded by the discriminative performance of both the features and the classifier. It is to be appreciated that, when a generic compression scheme is used to compress the incoming data, features that are highly discriminative, that is, that are conducive to robust decision-making, may be discarded in the compression process. Hence, the performance of the traditional classification framework may be effectively affected by the compression algorithm used. In some embodiments of the proposed framework, the compression module, the feature extraction module and the decision-making module are optimized together so that the features that are relevant to the decision-making process are more faithfully preserved than features that are less relevant after compression takes place.

As indicated by bracket 208, a compression method includes acquiring or receiving raw data and analyzing the raw data to determine content of the image, as shown with box 204. A data compression parameter is selected based on the content of the data and a received decision-making task, as shown with box 210. The data is thereafter compressed based on the selected compression parameter and output as a compressed data stream, which may be in turn stored or transmitted. The received decision-making task can be, for example, object recognition, in which case the compression algorithm would encode with high fidelity features that are conducive to accurate recognition of certain objects in a scene, e.g., people, vehicles, and/or structures. These may include, for example, features descriptive of shapes, color, or texture. In other embodiments, features that are conducive to accurate recognition of certain activities may be compressed with high fidelity. These may include, for example, features descriptive of motion patterns. Image-based features such as scale-invariant features (SIFT), histogram of oriented gradients (HOG), and local binary patterns (LBP), among others can be used. Video-based features that extract representation of batches of frames or video segments such as 3D SIFT, HOG-3D, space-time interest points (STIP), and dense trajectories (DT) can also be used. Once extracted, it is usually the features, rather than the original data, that are further processed in order to perform decisions or inferences based on the incoming data. For instance, classifiers often operate on feature representations of data in order to make decisions about class membership based on the learned decision-making rules.

According to the proposed system and method, data compression is carried out by lossy compression frameworks wherein the data to be processed is compressed via a process that is adaptable to the type of data and the type of decision-making process to be performed. In certain embodiments, lossy compression including the application of one or more non-linear mappings that map the raw data from its original high-dimensional space to a lower dimensional space, the parameters of the mapping being adjustable to at least one of the raw data and a task-oriented metric corresponding to a received decision-making task such as an object classification or action/activity recognition task from video data, a speech recognition or speaker identification task from audio data, an object detection or classification task from image data, among others. In certain embodiments, the decision-making task can be received prior to obtaining the raw data. In accordance with certain embodiments, the decision-making task can be received subsequent to obtaining the image data.

As indicated with bracket 212, a method of processing data acquired or received that is descriptive of a physical phenomenon can include analyzing the data in the compressed domain, as shown with box 214. Analysis in the compressed domain can include analyzing compressed audio to perform speech recognition or speaker identification. In another embodiment, analysis in the compressed domain can include analyzing compressed imagery to perform object recognition, classification or localization in a given incoming image. In yet another embodiment, analysis in the compressed domain can include analyzing compressed video data to perform action or activity recognition, for example to identify a suspicious event taking place. In yet another embodiment, compressed data from multiple modalities can be concurrently processed to perform an automated decision-making task.

In one embodiment, the compression framework, which we sometimes denote as task-oriented compression, is optimized a priori in conjunction with the decision-making task. This apriori or offline optimization is carried out by performing feature extraction on raw data for which the labels associated with the decision-making task are known. For example, if the decision-making task is object classification from imagery, the raw data used in the offline optimization stage may comprise a set of images and labels descriptive of the type of object depicted in the image (e.g., 'vehicle', 'human', building). The choice of features to be extracted from the raw data or preserved by the task-oriented compression algorithm, usually depend on the decision-making task. Once the incoming raw data is projected onto the feature space, a statistical classifier determines the optimal boundaries that separate data samples belonging to different classes, or having different labels, and at same time group together data samples belonging to the same class. Examples of such classifiers include k-nearest neighbors (k-NN), support vector machines (SVM), decision trees, decision tree ensembles, boosted weak classifiers, among others. Once trained, the classifier can be applied to newly incoming data for which the labels are unknown, and assign labels to the data, effectively performing decision-making. Simply put, the task of a statistical classifier is to learn optimal classification rules from a set of training data, which is usually accompanied by labels or ground truth. For example, when the task of a classifier is to distinguish between a motorcycle, a pedestrian and a sedan from images thereof, the classifier learns the classification rules in a training stage whereby a certain amount of images belonging to each class, along with the label denoting the class they belong to, are fed to the classifier. The training process of a classifier consists of finding the optimal boundaries that separate training samples belonging to different classes. The optimality of the boundary is measured according to a cost or loss function. Once trained, the classifier can process new data for which labels are unknown, and assign labels, or effectively perform a decision, based on where the new data falls relative to the learned boundaries or decision-making rules. The underlying assumption of the operation of a classifier is that the training data is representative of the data that the classifier will see at inference.

In one embodiment, when an SVM is used for classification, learning the optimal decision-making rule or training the SVM consists in finding the optimal vectors $w_i \in R^n$ which represent the normal vectors to the hyperplanes that best separate samples $x_k \in R^n$ belonging to different classes in the training set. When decision-making rules more complex than hyperplanes are desired, kernel transformations can be applied to the data. In the two-class scenario, data label $y_k$ for training sample $x_k$ is equal to either +1 or −1, and training the classifier consists in minimizing the absolute value or norm of w subject to $y_i(w \cdot x_k + b) \geq 1$. Once the SVM is trained, a new data sample xl belonging to an unknown class can be classified by computing the sign of $w \cdot x_l + b$.

When a neural network is used as a classifier, the training process involves learning the optimal set of weights in the connections between the different layers in the network given an objective quantified by a loss function. In some embodiments, a neural network with a softmax layer can be used for classification. In such cases, the optimal weights of the network can be optimized by minimizing one of a cross-entropy, mean squared error, or a divergence loss function. Once trained, the output of the softmax layer is indicative of the class of a new data sample; specifically, if the output of the k-th node in the softmax layer is the largest among all N nodes (where N is the number of classes) when data sample $x_l$ is fed to the network, then the determination made by the network is that $x_l$ belongs to class k.

Other classification algorithms can be used. For example, an expectation maximization (EM) algorithm can be used, which models the statistical distribution of the training data in the form of a parametric distribution. As a new data sample $x_l$ comes in, a decision is made about the class associated with it by determining which component in the distribution best describes the statistical behavior of $x_l$. In another embodiment, a k nearest neighbor algorithm can be used, whereby training data are clustered according to their class membership. When a new data sample $x_l$ is to be classified, its class is determined by a majority vote procedure on its k nearest training neighbors.

Once a classification or decision-making rule is learned from the training data, an encoding or compression scheme that reduces the number of bits required to represent data samples is implemented. In one embodiment, this encoding can be a vector quantization encoding. Vector quantization can be implemented by assigning a code of a given bit length to all points in the feature space that are located within a given region of the space. The number of bits in each code determines the compression capability of the vector encoding and usually depends on the number of different codes or regions. Generally speaking, and so as to achieve compression, the length or number of bits required to represent the codes associated with the compressed data is significantly smaller than that required to represent the raw data. In one embodiment, the regions selected are of uniform size, and all data points within a region fall on the same side of the classification rule. In other words, the vector encoding compresses the representation of the data points, and at the same time preserves the characteristics of the data points that are related to the decision-making task. In another embodiment, the regions selected have the same number of training data points, and consequently may be of different size; however, in this embodiment, the data points within a region still fall on the same side of the classification rule. Other embodiments where the regions represented by each vector have different sizes and different number of training samples can be employed. However, in all embodiments, all of the data points within a region encoded with a given vector are deemed to belong to the same class according to the trained classifier. Once the vector codes are determined at the training stage, the inference or online stage comprises receiving an incoming data sample of unknown class, finding its feature representation and compressing it with the vector encoding scheme by assigning it the code of the region in which it feature representation vector falls. Note that additional compression rations may be achieved by implementing lossless compression schemes on top of the vector encoding, including Huffman coding, arithmetic coding, Lempel Ziv coding, among others. Since the information relevant to the decision-making process is preserved by the lossy compression portion of the compression pipeline, the final compressed representation still has that information after the lossless portion of the compression is effected.

In accordance with certain embodiments, the task-oriented compression is implemented by means of unsupervised deep learning architectures, which can include static Auto Encoders (AEs), Convolutional Auto Encoders (CAEs), and Recurrent Auto Encoders (RAEs) to compress one-dimensional sequential data (including audio and motion, for example) high spatial resolution images, and high spatio-temporal resolution video. The task-oriented nature of the proposed compression framework is related to the fact that, although the transmitted and stored data can be represented with much fewer bits than the original data, the decisions made based on the compressed data closely approximate those made with the uncompressed data. This is, as stated, achieved by tuning the compression process relative to the decision-making task at hand.

AEs, CAEs and RAEs are examples of neural networks that are optimized to reconstruct a set of inputs provided as training samples. AEs, CAEs and RAEs comprise an Encoder and a Decoder stage. For the sake of simplicity, consider a traditional AE. The encoder stage reduces the dimensionality of the input and the decoder stage attempts to recover the input from its low-dimensional representation. Compression is achieved by using the low-dimensional representation of the input, instead of its full representation. In mathematical terms, given a collection of N training points $\{x_i\}_{i=1}^{N}$ where $x_i \in \Re^d$ in a d-dimensional space, the encoder produces a compressed representation $\{x_i'\}_{i=1}^{N}$ where $x_i' \in \Re^{d'}$ where d'<d, and the decoder attempts to reconstruct $\{x_i\}_{i=1}^{N}$ by producing outputs $\{\hat{x}_i\}_{i=1}^{N}$ where $\hat{x}_i \in \Re_d$. In a CAEs, the inputs may be tensors of order two or more, that is, $x_i \in \Re^{d_1 \times d_2 \times \cdots \times d_M}$ while in RAEs, the inputs are temporal sequences of scalar numbers, vectors or tensors. Thus, CAEs are appropriate to compress high-dimensional signals such as images and videos, while RAEs can compress both low- and high-dimensional signals and temporal sequences thereof. Without loss of generality, we constrain the discussion herein to AEs. The parameters of the functions that map the input from a high- to a low-dimensional space are learned by minimizing a cost function E that typically depends on the raw input and the reconstruction output. Specifically, the objective function can be written as Equation (1):

$$\min E(x_i, x_i')$$

s.t.

$$x_i' = g(Wx_i + b) \text{ and } \hat{x}_i = f(W'x_i' + b')$$

Equation 1 where g( ) and f( ) are predetermined non-linear functions such as sigmoids, tan h, and rectifier linear units, $W \in \Re^{d' \times d}$ and $W' \in \Re^{d \times d'}$ are matrices that perform dimensionality reduction and expansion, respectively, and $b \in \Re^{d'}$ and $b' \in \Re^d$ are bias vectors. The optimization task consists in finding the optimal values for W, W', b and b', that is, those that minimize the cost function E across a set of training samples. Note that Equation (1) denotes the operation of a single layer AE; however, in some embodiments it may be preferable to implement multi-layer embodiments.

As described above, implementation of AEs, CAEs, and RAEs usually takes place in a two-step procedure. In an offline or training stage, parameters of the networks are optimized based on a given objective, which is related to the decision-making task at hand. In the case of AEs, CAEs, and RAEs, the optimization takes place in an unsupervised manner, where the objective function aims at maximizing reconstruction accuracy of a given input at the output, the output being obtained by decompressing a compressed representation of the input. In the proposed method, in addition to a reconstruction error term, a task-related error term (e.g., an object or action classification or recognition error term) is also considered in the optimization of the autoencoder. This means that the parameters of the nonlinear mappings occurring at the intermediate layers of the autoencoder network are adjusted based on the joint optimization of a reconstruction metric (e.g., how accurately the original data can be recovered from its compressed representation) and a decision-making task such as classification or recognition (e.g., how accurately a given object or action can be identified in the compressed representation of an image or video). In one embodiment, the parameter adjustment is performed within a gradient descent framework, wherein the contribution of each of the parameters to the estimated combined error is computed, and the parameter is adjusted at each step so that its contribution to the error decreases; in this embodiment, the adjustment process can be stopped after a fixed number of iterations or, alternatively, after adjustment of the parameters results in improvement of the combined error by a magnitude smaller than a predetermined threshold. This results in intermediate representations that more efficiently maintain the information that is relevant to the task. In other words, while the recovered data may not necessarily faithfully represent the original data, the information contained therein is sufficient to carry out the decision-making task robustly and accurately. The compression architecture optimized in this manner can then be used as the input module to a computer vision (e.g., deep learning or otherwise) pipeline that effectively operates in the compressed domain, such as the one being proposed in the present disclosure.

In certain embodiments, the classification error can be measured in terms of the cross-entropy according to Equation 2:

$$E_c = -\frac{1}{N} \sum_{n=1}^{N} \sum_{k=1}^{K} y_k^n \log(\hat{y}_k^n)$$

Equation 2 where K is the number of classes or possible decisions in the decision-making task, N is the number of training samples, $y^n = [y_1, y_2, \ldots, y_K]$ is a vector denoting the true decision label associated with the n-th raw data sample, $x_n$, and $\hat{y}^n = [\hat{y}_1, \hat{y}_2, \ldots, \hat{y}_K]$ denotes the predicted label output when input $x_n$ is fed to the network. In certain embodiments, $y^n$ is a one-hot vector, that is, a vector with k-th entry equal to 1 and the remaining K−1 entries equal to 0, denoting that out of the K possible classes, raw data sample $x_n$ belongs to class k. As will be appreciated by those of skill in the art in view of the present disclosure, other classification error metrics can be used.

In one embodiment, the reconstruction error can be measured in terms of the Mean Squared Error according to Equation 3:

$$E_r = \frac{1}{N} \sum_{n=1}^{N} (x_n - \hat{x}_n)^2$$

Equation 3 where $x_n$ is the n-th raw data sample and $\hat{x}_n$ is the output reconstructed by the network when fed $x_n$ as input. Other reconstruction error metrics can be used.

In one embodiment, the overall loss function used to optimize the parameters of the network is a combination of a reconstruction and a classification metric according to Equation 4:

$$E = E_r + \lambda E_c$$

Equation 4:

where λ is a weight parameter that determines the relative importance between the reconstruction and the classification errors. Note that the network parameters obtained by the optimization of Equation 4 are used to compress and decompress the data involved in the analysis. Since the compression parameters are only known by the encoding and the decoding stage, the compressed representation is at the same time encrypted or hidden to an external observer unfamiliar with the parameters. Consequently, in addition to achieving task-oriented compression, the proposed framework achieves data security wherein the secret key required to decrypt the data comprises the network parameters. This is in contrast with traditional compression techniques which do not protect the originally encoded data.

The implementation of deep networks usually takes place in a two-step procedure. In the offline or training stage, the parameters of the networks are optimized based on a given objective. In the case of CAEs and RAEs, the optimization takes place in an unsupervised manner, where the objective function aims at maximizing reconstruction accuracy of a given input at the output, the output being obtained by decompressing a compressed representation of the input. For NNs, CNNs, RNNs and LSTMs, the optimization is supervised in that labels corresponding to the ground truth are required for the training data. The optimization is done in the form of backpropagation (across layers for NNs and CNNs, or across layers and time for RNNs and LSTMs) where the output corresponding to a given input is compared to the ground truth and the difference between both is used to adjust the network coefficients. In the online or inference stage, an input with an unknown label is fed into the network and forward propagated, producing a compressed representation (in the case of a CAE and a RAE), a feature representation (in the case of an NN and a CNN), or a set of sampling parameters and a class label (in the case of an RNN or an LSTM). Advantageously, the off-line stage can be down using readily available off-the-shelf processing engines and software. Examples of suitable processing engines for the off-line stage include the K80 graphical processing units (GPU) accelerator, available from the Nvidia Corporation of Santa Clara, Calif. The on-line and off-line stages can be implemented on the processing engine using deep learning software available such as Caffe, available from the Berkeley Vision and Learning Center of Berkeley, Calif.; Theano, available from the Université de Montreal of Montreal, Canada; and Digits, available from the Nvidia Corporation of Santa Clara, Calif.

As will be appreciated by those skilled in the art, aspects of the present embodiments may be embodied as a system, method or computer program product. Accordingly, aspects of the present embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in a flowchart and/or block diagram block or blocks.

The methods and systems of the present disclosure, as described above and shown in the drawings, provide for image acquisition methods with superior properties including real-time guidance to the image acquisition method. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. A method of compressing data, comprising:
receiving raw data;
receiving a decision-making task of a plurality of possible decision-making tasks, the decision-making task being directed at analyzing data for recognition or classification of actions;

analyzing the raw data to determine content, the analysis of the raw data being optimized dependent on the particular decision-making task received and including extraction and classification of features of the raw data;

adjusting at least one compression parameter in a compression algorithm based on the extracted and classified features of the raw data and the received decision-making task to produce a modified compression algorithm, the received decision-making task causing output compressed data to include the extracted features;

compressing the analyzed, raw data using the modified compression algorithm; and outputting a result of the compressing as compressed data.

2. The method as recited in claim 1, wherein the raw data includes data selected from a group including audio data, image data, and video data.

3. The method as recited in claim 1, further comprising analyzing the compressed data to issue a decision related to the decision-making task prior to receiving additional raw data.

4. The method as recited in claim 1, wherein the adjusted compression algorithm preserves with high fidelity the extracted features in the raw data that are relevant to the decision-making task.

5. The method as recited in claim 1, wherein the compression algorithm is an auto encoder and the compression parameter is initially established in a training stage.

6. The method as recited in claim 5, wherein the training stage adjusts at least one decision-making rule associated with the decision-making task based on the optimization of at least one of a reconstruction metric and a classification metric.

7. The method as recited in claim 1, wherein the decision-making task is received prior to receiving the raw data.

8. The method as recited in claim 1, wherein the decision-making task is received subsequent to receiving the raw data.

9. A method of compressing image data in the context of a decision-making task, the method comprising:

receiving raw image data;

receiving a decision-making task of a plurality of possible decision-making tasks, the decision-making task being directed at analyzing data for recognition or classification of actions;

analyzing the raw image data to determine content, the analysis of the raw data being optimized dependent on the particular decision-making task received and including extraction and classification of features of the raw data;

adjusting at least one compression parameter in a compression algorithm based on the extracted and classified features of the raw image data and the received decision-making task to produce a modified compression algorithm, the received decision-making task causing output compressed raw image data to include the extracted features;

compressing the analyzed, raw image data using the modified compression algorithm; and outputting data result of the compressing as compressed raw image data.

10. A data compression system, comprising:

a data-receiving device;

a controller operatively connected to the data-receiving device; and a non-transitory machine-readable memory disposed in communication with the controller and having instructions recorded thereon that, when read by the controller, cause the controller to:

receive raw data from the data-receiving device;

receive a decision-making task of a plurality of possible decision-making tasks, the decision-making task being directed at analyzing data for recognition or classification of actions;

analyze the raw data to determine content of the raw data, the analysis of the raw data being optimized dependent on the particular decision-making task received and including extraction and classification of features of the raw data;

adjust at least one compression parameter in a compression algorithm based on the extracted and classified features of the raw data and the received decision-making task to produce a modified compression algorithm, the received decision-making task causing output compressed data to include the extracted features;

compress the analyzed, raw data using the modified compression algorithm; and output a result of the compressing as compressed data.

11. The system as recited in claim 10, wherein the data-receiving device is a camera and the raw data includes image or video data.

12. The system as recited in claim 10, wherein the data-receiving device includes at least one of a global positioning system, a magnetometer, an accelerometer, a gyroscope, a network device, and a microphone, and wherein the raw data includes data descriptive of at least one of orientation, speed, position, acceleration, motion, audio, transaction, text, and speech.

13. The system as recited in claim 10, wherein the instructions cause the controller to adjust at least one decision-making rule relevant to the decision-making task based on the content of the compressed data, and wherein the compression algorithm and the decision-making rule are adjusted coincident with one another.

14. The system as recited in claim 10, wherein the modified compression algorithm preserves with high fidelity features in the raw data that are relevant to the decision-making task carried out by a decision-making algorithm.

15. The system as recited in claim 14, wherein the decision-making algorithm is a statistical classifier.

16. The system as recited in claim 14, wherein the statistical classifier includes at least one of a support vector machine, a decision tree, a k-nearest neighbor, a decision tree ensemble, and a neural network.

17. The system as recited in claim 10, wherein the compression algorithm includes an auto encoder, and wherein the parameter adjustment is done in a training stage of the autoencoder.

18. The system as recited in claim 17, wherein autoencoder includes one of a static autoencoder, a convolutional autoencoder, and a recurrent autoencoder.

19. The system as recited in claim 14, wherein the decision-making task is a classification task, and wherein the decision-making rule associated with the classification task is adjusted in a training stage based upon on optimization of at least one of a reconstruction metric and a classification metric.

20. The system as recited in claim 11, wherein the instructions cause the controller to receive a decision-making task prior to receiving the raw data.

21. A method of compressing data, comprising:

receiving raw data;

receiving a decision-making task of a plurality of possible decision-making tasks, the decision-making task being directed at analyzing data for recognition or classification of actions;

analyzing the raw data to determine content, the analysis of the raw data being optimized dependent on the particular decision-making task received and including extraction and classification of features of the raw data;

adjusting at least one compression parameter in a compression algorithm based on the extracted and classified features of the raw data and the received decision-making task to produce a modified compression algorithm;

compressing the analyzed, raw data using the modified compression algorithm; and outputting a result of the compressing as compressed data, wherein the received decision-making task causing the output compressed data to include features descriptive of actions classified as one of activity being carried out by people.

* * * * *